United States Patent [19]

Oquidam

[11] 4,095,585

[45] Jun. 20, 1978

[54] SOLAR ENERGY COLLECTOR WITH ON SITE STORAGE

[75] Inventor: Bernard Oquidam, Bourg de Peage, France

[73] Assignee: Compagnie pour l'Etude et la Realisation de Combustibles Atomiques, Paris, France

[21] Appl. No.: 750,373

[22] Filed: Dec. 14, 1976

[30] Foreign Application Priority Data

Dec. 30, 1975 France .................................. 75 40429

[51] Int. Cl.$^2$ .............................................. F24J 3/02
[52] U.S. Cl. ..................................... 126/271; 126/400; 237/1 A; 165/104 S
[58] Field of Search ....................... 126/270, 271, 400; 237/1 A; 165/104 S; 62/436; 219/530, 540, 341, 378, 365, 325, 326

[56] References Cited

U.S. PATENT DOCUMENTS

| 2,145,308 | 1/1939 | Jordan et al. ...................... 165/104 S |
| 2,936,741 | 5/1960 | Telkes ................................ 165/104 S |
| 3,077,190 | 2/1963 | Allen .................................. 126/271 |
| 3,689,738 | 9/1972 | Laing ................................. 126/400 |
| 3,743,782 | 7/1973 | Laing ................................. 165/104 S |
| 4,020,989 | 5/1977 | Kantz ................................ 126/27 D |

Primary Examiner—John J. Camby
Assistant Examiner—Henry C. Yuen
Attorney, Agent, or Firm—Dennison, Dennison, Meserole & Pollack

[57] ABSTRACT

In a solar energy collector with on site storage, the storage unit is constituted of two insulating panels and, between them, a structure formed of two corrugated walls which are joined on one part of their surface, the whole assembly defining three separate volumes. One of the volumes is connected with the free space between the storage unit and a forward partition and constitutes with it the primary circuit. Another volume is connected with the user and constitutes with it the secondary circuit.

9 Claims, 3 Drawing Figures

SOLAR ENERGY COLLECTOR WITH ON SITE STORAGE

The object of the present invention is a solar energy collector with on site storage.

Solar energy collectors with on site storage are already known wherein they include a storage unit and a glass partition separated by a free space wherein is found a heat exchanger element, and the storage unit is constituted of two independent elements of which the first is in connection with the free space and constitutes, with this space, a primary circuit with a first heat-carrying fluid passing therethrough and of which the second is connected with at least one user member and which constitutes, with it, a secondary circuit wherein a second heat-carrying fluid passes therethrough independent of the first.

Each of the two elements of the storage unit is constituted for example of essentially vertical conduits.

The object of the present invention is to obtain an improved embodiment of the storage unit which permits rapid heating of the area right from the beginning of the period of sunshine, and this storage unit can be realized simply and economically and can be easily produced.

Another object is to empower such a storage unit so that it can use as primary or secondary heat-carrying fluid either a gas such as air, or a liquid such as water, which permits any of the four air-air, air-water, water-air, water-water combinations.

The solar energy collector with on site storage according to the invention is constituted of a glass partition and a storage unit separated by a free space enclosing heat absorbing elements. The storage unit is constituted of two essentially parallel insulating panels, and, between these panels, a structure formed of two corrugated walls having a part of their surface in contact with each other and joined at this part of their surfaces, the assembly of the panels and the structure partitioning off at least three separate volumes:
- a first volume between the first panel and the opposite corrugated wall,
- a second volume constituted of the joining of the volumes included between the two corrugated walls, and
- a third volume between the second panel and the second corrugated wall, wherein at least one of these volumes is connected with the free space between the glass partition and the storage unit and constitutes with it the primary circuit, and at least one other of these volumes is connected with the user member and constitutes the secondary circuit.

A first variation consists in using the first volume for the primary circuit and the third volume for the secondary circuit, the second volume containing a static fluid which constitutes a storage mass.

A second variation consists in using the second volume for the primary circuit or secondary circuit and, for the other circuit, using only one of the two other volumes or even communicating these two other volumes together so that they together constitute one single circuit.

It can be advantageous, particularly in the case where there is a fluid pressure differential between the inside and the outside of the second volume, to provide at least one flat sheet between the two corrugated walls and joined with them, with their surfaces in contact, the sheet destined to oppose the hydraulic pressure. This flat sheet can have openings to put the volumes on each side of it in communication.

One particular embodiment provides a contact on a part of their surface between at least one insulating panel and the opposite corrugated wall so as to constitute essentially vertical conduits.

The corrugated walls are realized preferably of a good heat conductive material, such as for example aluminum, so as to permit good heat exchange between the different volumes, but they can also have a poorly conductive covering which is destined to deflect the heat.

The invention is explained relative to the embodiments shown in the attached drawings.

In these drawings, the same elements have the same reference numerals.

Figure 1:
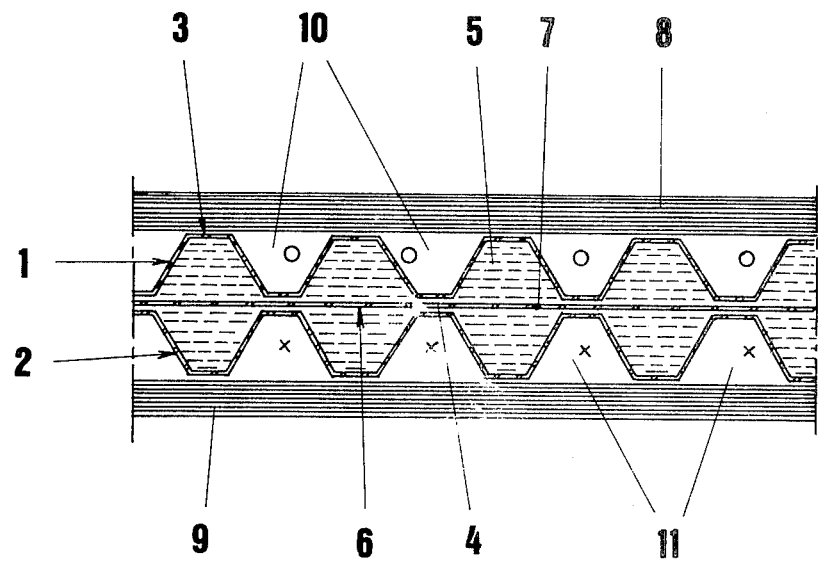
FIGS. 1 and 2 show cross sections of two examples of storage units and collection elements according to the invention.
Figure 2:
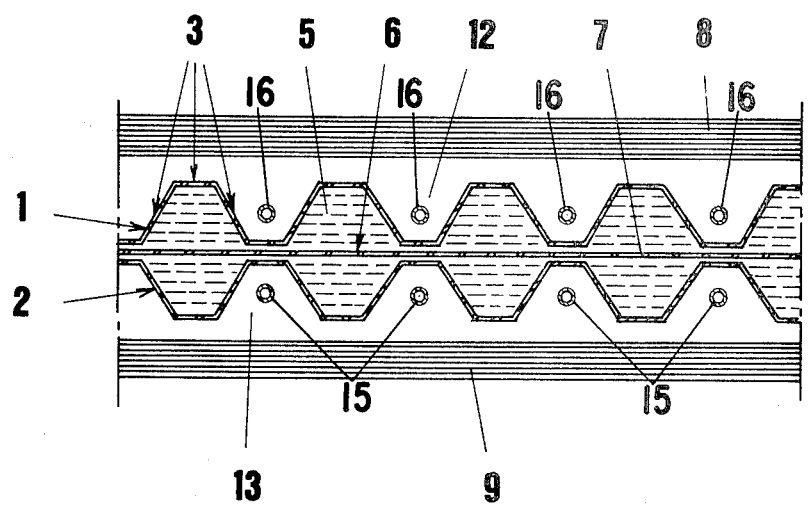

The storage unit shown in both FIG. 1 and FIG. 2 comprises two metal plates 1 and 2, for example aluminum. These plates are folded so as to define corrugations 3 which assure the rigidity of the unit and permit reduction of the thickness thereof to the minimum. The plates 1 and 2 are joined along their contact surfaces 4, by soldering, brazing, gluing or riveting. Spaces 5 between plates 1 and 2 contain a liquid. To oppose the hydraulic pressure, a third metal plate 6 is placed between plates 1 and 2 and joined with them along the contact faces 4. Plate 6 can be continuous or intermittent. If continuous, it has holes 7, to put the fluid in corrugations 3 in communication on both sides of this plate 6. This assembly of three plates 1 – 2 – 6 is placed between two insulating panels 8 and 9 and is sealed at the top and bottom thereof either by an element which is soldered, brazed, glued or rivetted, or by crushing of the ends of the corrugations and soldering about the four sides of the assembly.

Of course, some material other than a folded metallic plate can be used to obtain the desired structure.

As shown in FIG. 1, panels 8 and 9 can be in contact with corrugations 3, thus forming passages 10 for panel 8 and passages 11 for panel 9. Alternatively, the panels 8 and 9 can be spaced from corrugations 3, as in FIG. 2, to thus constitute two continuous spaces, space 12 between panel 8 and the corrugations, and space 13 between panel 9 and the corrugations.

Therefore, three noncommunicating volumes are defined; the passages 10 or space 12, the volume constituted by the assembly of the inner spaces 5, and passages 11 or space 13.

Two circuits are needed, a primary circuit for the first heat-carrying fluid which serves for the contribution of calories received by the solar ray absorption surface or solar heat absorbing elements, the other circuit for the second heat-carrying fluid, which causes the extraction of calories, and which is connected to the area of use. Any two of the volumes of the heat exchanger can be used respectively for the first and second fluids, the third circuit remaining closed but filled with a static fluid and constituting a heat storage. Alternatively, two of the volumes can be joined to constitute one of the circuits, the other circuit being constituted by the remaining volume.

For example, passages 10 or space 12 can be used for the first circuit and passages 11 or space 13 for the second circuit, with spaces 5 being closed and filled with liquid for storage of the heat. Also, spaces 5 can be used for one of the circuits and thus would no longer be closed. For the other circuit, passages 10 and 11 together or spaces 12 and 13 together can be used.

Figure 3:
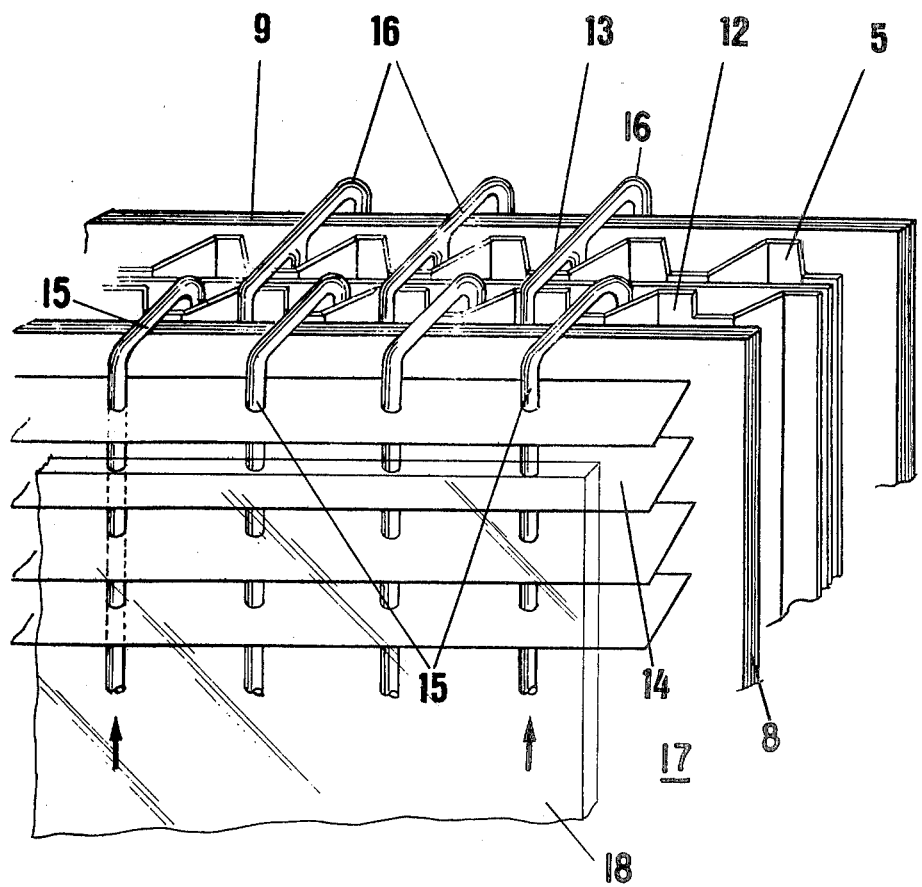
FIG. 3 shows a perspective of a collector.

In the example shown in FIG. 3, spaces 5 receive the first heat-carrying fluid and constitute the first circuit, while spaces 12 and 13 together receive the second heat-carrying fluid and constitute the second circuit. Any other combination is also possible.

By using a good heat conductive material, such as aluminum or copper, to constitute metal plates 1, 2 and 6, heating of the plates occurs which permits direct transfer of the heat from the first to the second heat-carrying fluid. This permits use of the calories from the beginning of the sun period. In case the calories carried in the first fluid are not used, this is heated, spaces 5 being of such dimensions as to accumulate the calories collected during the sunshine period. Spaces 5 then serve for storage.

The collection itself of the solar energy can be effected for example with the aid of a solar ray absorption surface consisting of solar heat absorbing elements or slats 14 mounted on tubes 15 in which the first heat-carrying fluid is carried, as in FIG. 3. These solar heat absorbing elements or slats 14 are positioned with the free space 17 between the glass partition 18 and the storage unit panel 8. The tubes 15 are connected to spaces 5 of the heat exchanger-storage unit described above. The circulation of the first heat-carrying fluid can be accomplished by thermosiphon or by forced circulation whereby a small pump is interposed in the tubing connecting one of tubes 15 to the heat exchanger (not shown).

Collectors 16, shown connected to spaces 12 and 13, evacuate the heat-carrying fluid toward the area of use, which will customarily involve heating of buildings but can also be a sanitary hot water system, particularly in the water-water arrangement.

The storage panel which is thus obtained can be mounted in an insulating casing on which there are or are not insulating panels, and the heat exchanger system provided in the free space behind a spaced glass partition.

This arrangement can permit mounting in panel arrangements traditional in wall panel technology.

It is also possible to mount the storage panel directly to the rear of the partition, so that the face 2, which is absorbant, is heated directly by the solar rays. An infrared anti-leakage device (reflecting blind, treated glass . . . ) is then advisable. The extraction can be accomplished normally through the passages 10, as the front passages 11 are confined. I claim:

1. In a solar energy collector with on site storage constituted of a glass partition and a storage unit separated by a free space enclosing at least one solar heat absorbing element; the storage unit comprising first and second insulating panels which are essentially parallel and, between these panels, a structure formed of two corrugated walls having a part of their surfaces in contact with each other and joined at this part of their surfaces, the assembly of panels and structure defining at least three separate volumes; a first volume between the first panel and the opposite corrugated wall, a second volume between the two corrugated walls, and a third volume between the second panel and the second corrugated wall, at least one of these volumes being in fluid communication with the free space between the partition and the storage unit and constituting with it a primary circuit, and at least one other of these volumes being in fluid communication with a user and constituting with it a secondary unit.

2. A solar energy collector as in claim 1, wherein the first volume is in fluid communication with the primary circuit and the third volume with the secondary circuit, the second volume containing a static fluid constituting a storage mass.

3. A solar energy collector as in claim 1, wherein one circuit is in fluid communication with the second volume, the other circuit with the first volume, and the third volume is in fluid communication with one of the other volumes.

4. A solar energy collector as in claim 1, wherein at least one flat sheet, to oppose the hydraulic thrust, is interposed between the two corrugated walls and joined with them on their contact surfaces.

5. A solar energy collector as in claim 4, wherein the flat sheet interposed between the two corrugated walls has openings to permit communication of the spaces on both sides of the sheet.

6. A solar energy collector as in claim 5, wherein one at least of the corrugated walls is in contact on a part of its surface with the insulation panel which is opposite it in such a manner as to constitute essentially vertical conduits.

7. A solar energy collector as in claim 3, wherein at least one flat sheet, to oppose the hydraulic thrust, is interposed between the two corrugated walls and joined with them on their contact surfaces.

8. A solar energy collector as in claim 7, wherein the flat sheet interposed between the two corrugated walls has openings to permit communication of the spaces on both sides of the sheet.

9. A solar energy collector as in claim 2, wherein one at least of the corrugated walls is in contact on a part of its surface with the insulation panel which is opposite it in such a manner as to constitute essentially vertical conduits.

* * * * *